United States Patent
Fu et al.

(10) Patent No.: US 8,108,537 B2
(45) Date of Patent: Jan. 31, 2012

(54) METHOD AND SYSTEM FOR IMPROVING CONTENT DIVERSIFICATION IN DATA DRIVEN P2P STREAMING USING SOURCE PUSH

(75) Inventors: Zhenghua Fu, Yorktown Heights, NY (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/179,150

(22) Filed: Jul. 24, 2008

(65) Prior Publication Data

US 2010/0023633 A1    Jan. 28, 2010

(51) Int. Cl.
*G06F 15/16* (2006.01)
(52) U.S. Cl. ......................... 709/231
(58) Field of Classification Search .......... 709/204, 709/205, 226, 229, 231–235, 241, 242; 718/104–106
See application file for complete search history.

(56) References Cited

U.S. PATENT DOCUMENTS

| | | | | |
|---|---|---|---|---|
| 6,922,724 B1* | 7/2005 | Freeman et al. | ............... | 709/223 |
| 7,260,568 B2* | 8/2007 | Zhang et al. | ............... | 707/711 |
| 7,284,047 B2* | 10/2007 | Barham et al. | ............... | 709/224 |
| 7,293,107 B1* | 11/2007 | Hanson et al. | ............... | 709/245 |
| 7,519,536 B2* | 4/2009 | Maes et al. | ............... | 704/270.1 |
| 7,543,020 B2* | 6/2009 | Walker et al. | ............... | 709/203 |
| 7,613,722 B2* | 11/2009 | Horvitz et al. | ............... | 1/1 |
| 7,613,772 B2* | 11/2009 | Bartram et al. | ............... | 709/205 |
| 7,627,678 B2* | 12/2009 | Datta et al. | ............... | 709/227 |
| 7,633,887 B2* | 12/2009 | Panwar et al. | ............... | 370/254 |
| 7,644,173 B1* | 1/2010 | Zhang | ............... | 709/231 |
| 7,657,597 B2* | 2/2010 | Arora et al. | ............... | 709/206 |
| 7,657,648 B2* | 2/2010 | Xiong et al. | ............... | 709/231 |
| 7,685,301 B2* | 3/2010 | Mai | ............... | 709/230 |
| 7,716,077 B1* | 5/2010 | Mikurak | ............... | 705/7.12 |
| 7,721,337 B2* | 5/2010 | Syed | ............... | 726/26 |
| 7,773,536 B2* | 8/2010 | Lloyd et al. | ............... | 370/252 |
| 7,778,260 B2* | 8/2010 | Sturniolo et al. | ............... | 370/401 |
| 7,877,353 B2* | 1/2011 | Ahmed et al. | ............... | 707/611 |
| 7,899,915 B2* | 3/2011 | Reisman | ............... | 709/228 |
| 2004/0136379 A1* | 7/2004 | Liao et al. | ............... | 370/395.21 |
| 2005/0052992 A1* | 3/2005 | Cloonan et al. | ............... | 370/229 |
| 2007/0038610 A1* | 2/2007 | Omoigui | ............... | 707/3 |
| 2007/0060109 A1* | 3/2007 | Ramer et al. | ............... | 455/414.1 |
| 2007/0064715 A1* | 3/2007 | Lloyd et al. | ............... | 370/401 |
| 2007/0130361 A1 | 6/2007 | Li | | |
| 2007/0262860 A1* | 11/2007 | Salinas et al. | ............... | 340/539.12 |
| 2008/0134258 A1* | 6/2008 | Goose et al. | ............... | 725/91 |
| 2008/0307094 A1* | 12/2008 | Karonen et al. | ............... | 709/226 |
| 2008/0313350 A1* | 12/2008 | Swinton et al. | ............... | 709/240 |
| 2009/0063691 A1* | 3/2009 | Kalofonos et al. | ............... | 709/229 |
| 2009/0070482 A1* | 3/2009 | Hickmott et al. | ............... | 709/233 |
| 2009/0182815 A1* | 7/2009 | Czechowski et al. | ............... | 709/206 |
| 2009/0210489 A1* | 8/2009 | Deb et al. | ............... | 709/204 |
| 2009/0327918 A1* | 12/2009 | Aaron et al. | ............... | 715/751 |
| 2010/0011103 A1* | 1/2010 | Luzzatti et al. | ............... | 709/226 |
| 2010/0064049 A1* | 3/2010 | Magharei et al. | ............... | 709/229 |

* cited by examiner

*Primary Examiner* — Andrew Caldwell
*Assistant Examiner* — Melvin H Pollack
(74) *Attorney, Agent, or Firm* — Tutunjian & Bitetto, P.C.; Preston J. Young, Esq.

(57) ABSTRACT

A system and method for improving content diversification in data driven streaming includes computing a weight factor and a qualification factor for each of at least two nodes among a plurality of nodes, based upon a bandwidth of each node. Content is pushed to a node based on the qualification factor and the weight factor of each node. The qualification factor is updated for the node which received pushed content.

25 Claims, 4 Drawing Sheets

METHOD AND SYSTEM FOR IMPROVING CONTENT DIVERSIFICATION IN DATA DRIVEN P2P STREAMING USING SOURCE PUSH

BACKGROUND

1. Technical Field

The present invention relates to data streaming systems and more particularly to a system and method for improving content diversification using source pushed data without building a tree.

2. Description of the Related Art

Multimedia content delivery using peer-to-peer (P2P) technology has proven to have a scalability advantage over a traditional client/server or content delivery network (CDN) infrastructure-based delivery model. Popular applications include bitTorrent, PPLive, Coolstreaming, etc.

Data driven P2P networks include a basic bitTorrent protocol model. In a data driven P2P network, nodes connect to each other to form a random mesh. A node pulls chunks of content from its neighbors until the complete multimedia content replica is obtained.

Data driven P2P swarming will now be described. A joining node first contacts a bootstrapping node, usually a tracker or the content source, to obtain a list of existing peers of a session. The joining node then tries to establish a connection with a subset of nodes on the list. Neighboring nodes exchange a buffer map (BM) to announce their local content availability. Based on this information, a node can pull missing chunks from the corresponding neighbors.

Content diversity is the difference in locally buffered content between a node and its neighbor. For example, if a node has chunks 1 and 3, and its neighbor also has chunks 1 and 3, then there is nothing new they can exchange. However, if the node's neighbor has chunks 2 and 4, then the upload bandwidth of the both nodes can be utilized for uploading the missing chunks to each other. The higher the content diversity, the more upload bandwidth can be utilized. This leads to better P2P streaming performance in terms of higher streaming rate or lower delay and latency.

There are several existing methods to improve content diversity in data driven P2P streaming systems. "Rarest First" is a pull based method. Nodes pull rarest chunks in their neighborhood first. While this improves content diversity, the success of this method depends on the pulling node's BM information accuracy. Periodically, out-dated BM information makes the "Rarest" chunks get downloaded multiple times from the same source in the neighborhood. This decreases the potential for more efficient content swarming.

Recently, a new method for improving content diversity has been proposed. A source divides the content into sub-streams, say sub-stream 1 has chunks 1, 3, 5, . . . and sub-stream 2 has chunks 2, 4, 6, . . . , etc. Peers subscribe to sub-streams by picking a suitable parent to receive the feed. The source pushes each sub-stream to a corresponding sub-scribing tree. Peers receiving different sub-streams differ greatly in their content, thus achieving a high content diversity. Trees are also built to force different content to flow through different sets of peers with the purpose for improving content diversity.

The weakness of all these methods is the reduced robustness against system churn due to the fact that distribution trees are needed. In practice, building and maintaining trees contributes to system fluctuation especially during high churn when users frequently join and leave.

SUMMARY

This disclosure describes embodiments to improve content diversification for data driven P2P streaming systems without building a tree.

A system and method for improving content diversification in data driven streaming includes the following for each content source. A weight factor for each node in a streaming environment is computed based upon a bandwidth for that node. An updated qualification factor is maintained for each node which is determined based upon the weight factor and a current qualification factor. New content is distributed in a data streaming environment according to nodes with a highest qualification factor to increase content diversity among the nodes.

A system and method for improving content diversification in data driven streaming includes computing a weight factor and a qualification factor for each of at least two nodes among a plurality of nodes, based upon a bandwidth of each node. Content is pushed to a node based on the qualification factor and the weight factor of the node. The qualification factor is updated for the node which received pushed content.

A system for data driven streaming includes a source configured to push content to a plurality of nodes. The source includes a host cache configured to store a listing of at least a portion of nodes in the system to which content is to be pushed. A qualification factor is maintained at at least two nodes, the qualification factor being updated based upon available upload bandwidth. The source employs the qualification factor of the at least two nodes to select K nodes to push new content to thereby increasing content diversity among the nodes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles describe improvements to content diversification for data driven peer-to-peer (P2P) streaming systems without building a tree. A Source Push (SP) system and method are provided which actively distribute different content chunks to different peer nodes so that the upload bandwidth of peer nodes can be efficiently utilized.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
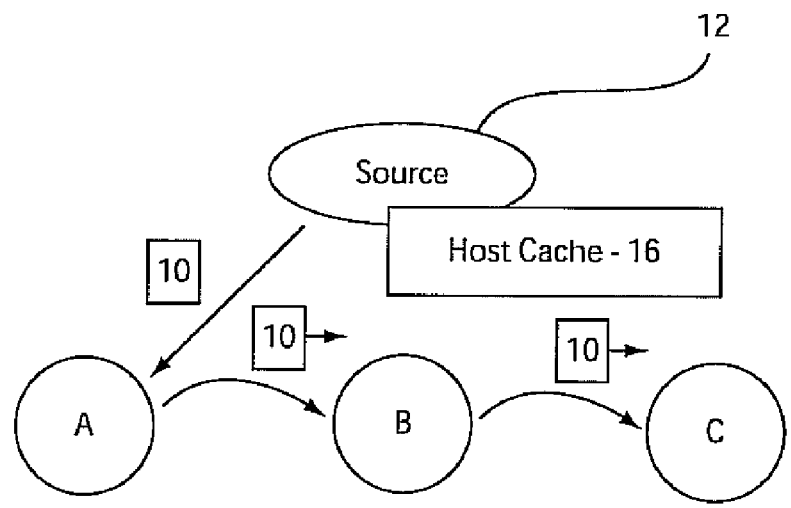
FIG. 1 is a diagram showing a distribution of a new content chunk from a source which selects node A from its host cache as a push target in accordance with an illustrative embodiment.
Figure 2:
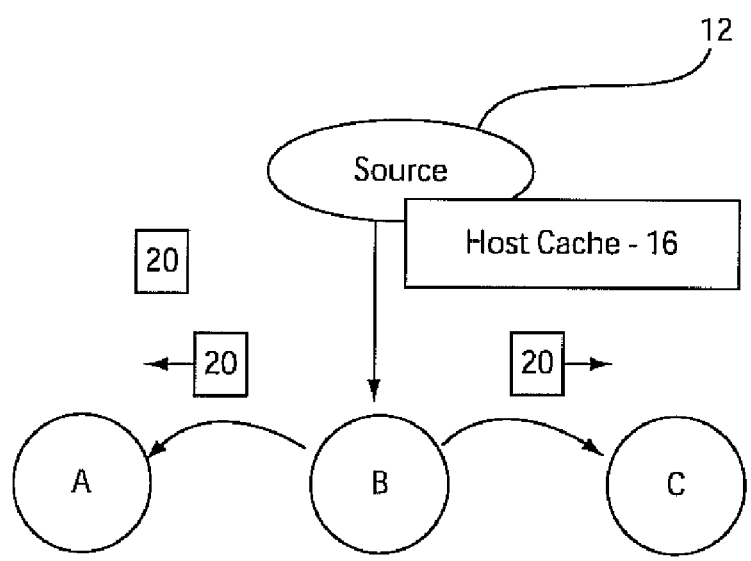
FIG. 2 is a diagram showing the distribution of a content chunk received later than the chunk in FIG. 1.
Figure 3:
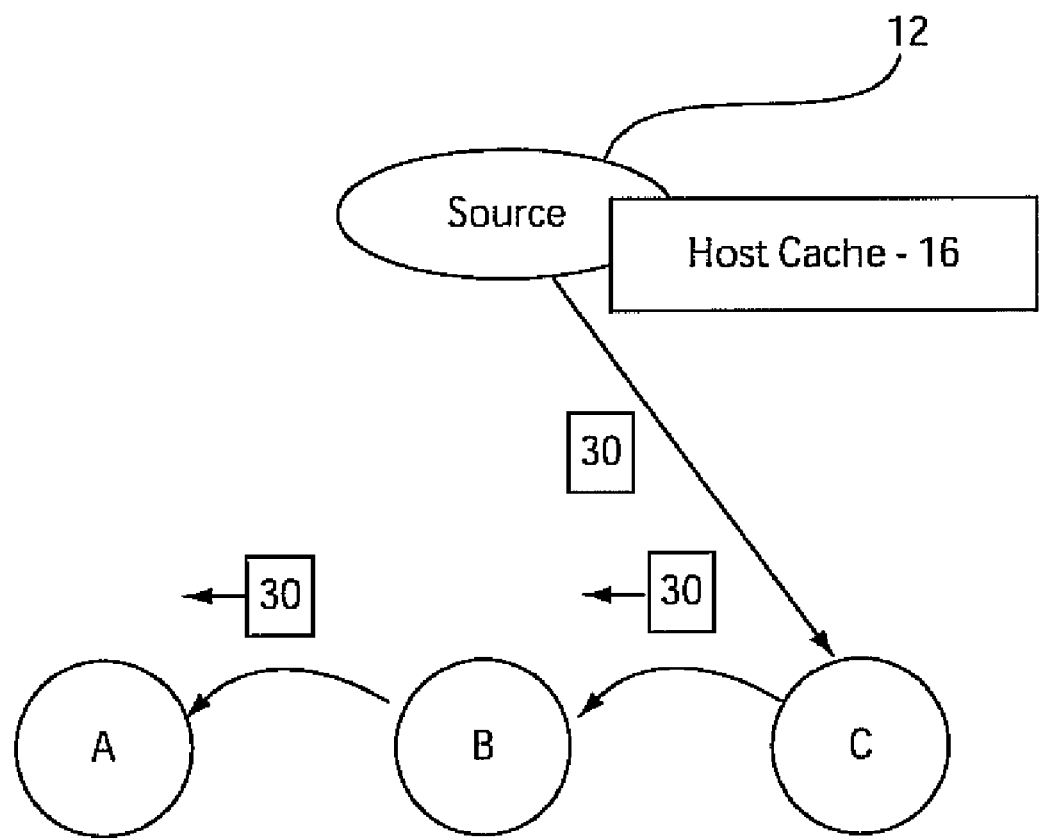
FIG. 3 is a diagram showing the distribution of a content chunk received later than the chunk in FIG. 2.

Referring now to the drawings in which like numerals represent the same or similar elements and initially to FIGS. 1-3, a source push system is illustratively shown in accordance with the present principles. In FIG. 1, as a new content chunk 10 comes in, a source 12 selects node A from its host cache 16 as a push target. The new content 10 is further delivered to other peers (nodes B and C) via a normal data driven pull-based method. FIG. 2 shows what occurs when a new content chunk 20 arrives. FIG. 3 shows what occurs when a new content chunk 30 arrives.

The Source Push (SP) scheme actively distributes different content chunks to different peer nodes so that upload bandwidth of peer nodes can be efficiently utilized. In FIGS. 1-3, the SP operation is illustratively shown. The source 12 reserves a portion of its upload bandwidth for the purpose of Source Push, say, B bps. If the current streaming rate is R bps, the source 12 estimates a ratio K where K=B/R. In addition, the source 12 maintains a Host Cache (HC) 16 listing of a subset of peer nodes (e.g., nodes A, B, C) currently in the system. HC 16 also stores information related to each node which will be employed for selecting a next node to receive pushed information for the source. Upon arrival of a chunk of new content, the source 12 selects K nodes from its host cache 16 to push the chunk to. K may be calculated or selected based on the application.

For this example we assume K=1. When chunk 10 comes, the source 12 selects node A from host cache 16 and pushes the chunk 10 to node A without waiting to be pulled. The chunk 10 is then further disseminated to other nodes (B and C) via normal pull-based data-driven methods. This operation repeats upon new content arrival. The source 12 maintains a partial view of all the current peers in the system in the host cache (HC) 16. When a node joins, the source 12 is informed and the new node is put into the HC 16. In addition, existing nodes periodically, say, every $m_1$ seconds, send keep-alive-messages to the source 12 to refresh their entries in HC 16. For instance, we can choose $m_1$=5. Those entries that failed to refresh during, e.g., $m_2$ consecutive periods are removed from HC 16. For instance, we can choose $m_2$=2. In addition, as the total number of peers in the system exceeds the total of number of HC entries, the least refreshed entries are replaced by a new entry. Pseudo-code for HC operations is presented in the following example A:

EXAMPLE A

```
Data type of peer_info
Begin
    int    nodeid
    int    upload_bandwidth
    float last_refreshed_at
End
add_HC_Entries(peer_info)
Begin
    if totalEntries >= MAX_ENTRIES
        i = find_Least_Refreshed_Entry(HC)
        totalEntries = totalEntries -1
    else
        i = find_Unused_Entry(HC)
    endif
    enter_HC_Entry(i, peer_info)
    totalEntries = totalEntries + 1
End
remove_HC_Entries(peer_info)
Begin
    i =  find_Index(HC, peer_info)
    delete_HC_Entry(i)
    totalEntries = totalEntries -1
End
refresh_HC_Entries(peer_info)
Begin
    i = find_Index(HC, peer_info)
    if not found
        add_HC_Entries(peer_info)
    else
        enter_HC_Entry(i, peer_info)
    Endif
End
```

Advantageously, the Source Push method presented does not need to build and maintain a tree structure or graph among the peer nodes for purposes of selecting which nodes to push content chunks. Instead, the Source Push method only needs the source to maintain a HC 16, which can be achieved by relatively less expensive soft-state operations such as periodical message refreshing operations. Impact of frequent node joins and leaves can be reduced by increasing the bandwidth reservation for Source Push. That is, when K is large enough (e.g., K=3 or 4), the chance of K replicas all pushed to nodes that have already left is low.

Figure 4:
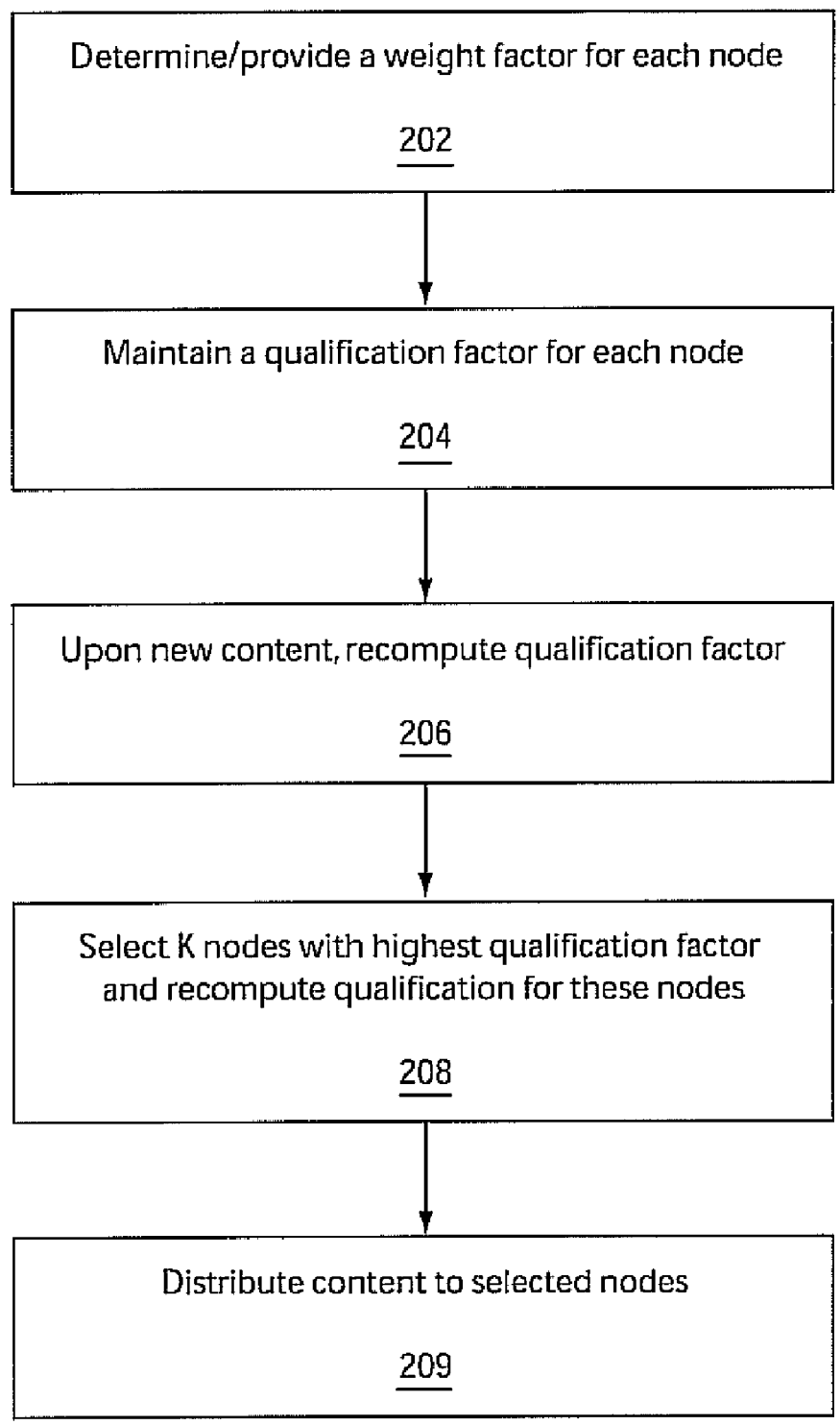
FIG. 4 is a block/flow diagram showing a system/method for maintaining and selecting nodes in a source push data driven stream environment where the content is pushed to provide an increase in content diversity in accordance with the present principles.

Referring to FIG. 4, one preferred system/method is illustratively depicted for selecting K nodes from HC. One goal is to evenly distribute new content according to a weight factor. A particularly useful weight factor may be, e.g., based on the respective upload bandwidth of each node. Specifically, nodes with higher upload bandwidth will receive new content more often, while those with lower upload bandwidth will still have a fair chance to receive new content.

The method preferably employs a greedy online algorithm which optimizes bandwidth usage. In block 202, each node in the HC is assigned or has a computed weight factor w. For node i, $w(i)=bw(i)/sum(bw(j))$, for all nodes j in HC, where bw is the bandwidth and sum is a summation function. In block 204, each node also maintains an on-going qualification factor q. Upon each new content arrival, each node determines the qualification factor as, e.g., $q(i)=q(i)+w(i)$ in block 206. Note that i is the node id, the qualification factor may be initially zero or set to any default number. The qualification factor dynamically changes with each push so that the previous $q(i)$ is added to the changing weights $w(i)$ (which is preferably based upon the bandwidth which dynamically changes over time). Then, in block 208, the source picks K nodes with the highest qualification factors and subtracts 1/K (or other factor) from the qualification factor of each of these K nodes. Other reductions of the qualification factor may be implemented as well. In block 209, content is distributed to these K nodes.

The algorithm may be implemented in software and is illustratively demonstrated by the following illustrative program code in Example B:

EXAMPLE B

```
get_Push_Target(K)
Begin
    sum=getBWSum(HC)
    for i in HC
        w(i) = bw(i)/sum
        q(i) = q(i) + w(i)
        if q(i) > MAX_QUALIFICATION          /* This part
            q(i) = MAX_QUALIFICATION             is optional
        end if                                */
    end for
    sort(q, idx)
    target_list = [idx(1), idx(2), ... , idx(K)]
    for i in 1...K
        q(idx(i)) = q(idx(i)) – 1/K
    end for
    return target_list
End
```

Figure 5:
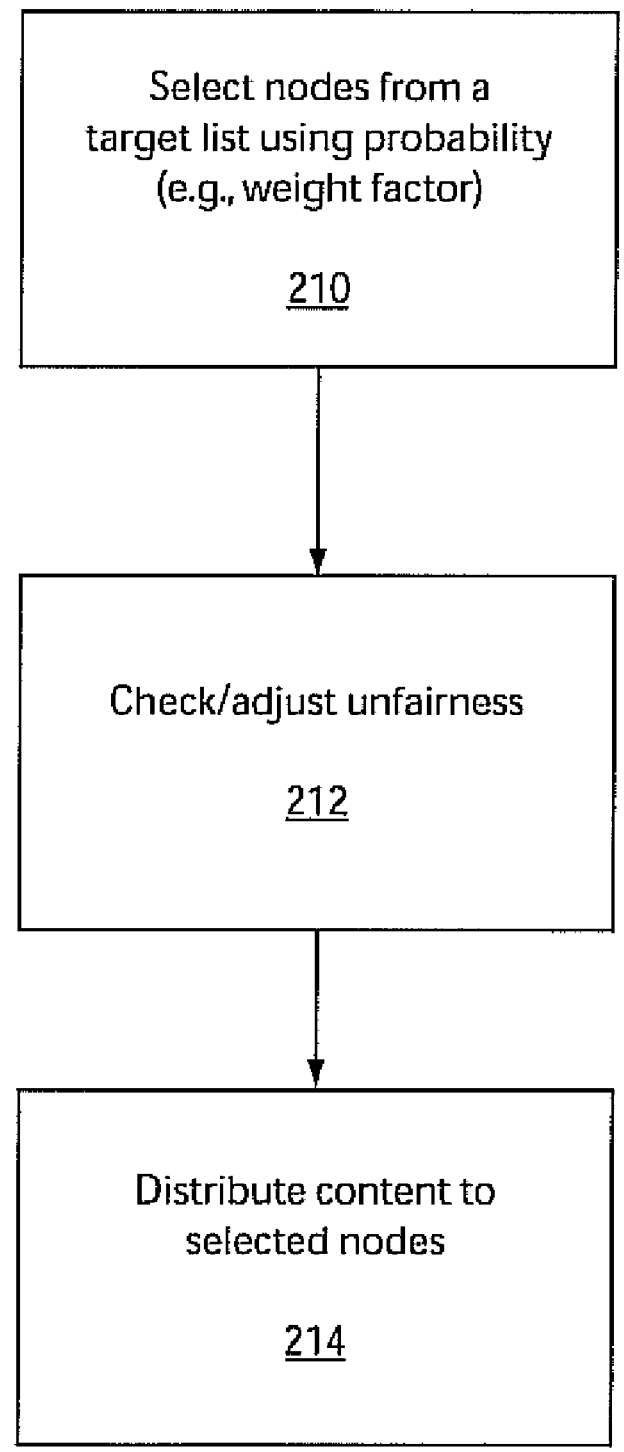
FIG. 5 is a block/flow diagram showing a system/method for selecting nodes using probability in a source push data driven stream environment where the content is pushed to provide an increase in content diversity in accordance with the present principles.

Referring to FIG. 5, in an alternate embodiment, a target list of nodes stored, for example in a host cache, may be selected (e.g., K nodes) in a probabilistic way in block 210. For example, each node is associated a probability $p(i)$ such that the sum of all $p(i)$ equals 1, and we choose nodes such that node i is chosen with probability $p(i)$.

One method to accomplish this is as follows. A number A between 0 and 1 is randomly selected, and node i is chosen if A lies between $p(1)+p(2)+ \ldots +p(i-1)$ and $p(1)+p(2)+ \ldots +p(i)$. This is repeated K times to pick K nodes. The probabilities $p(i)$ can be chosen to be equal to the weight $w(i)$. The probability may also be based on environment or system conditions, client preferences, performance criteria or any number of factors. The probabilistic approach may generate short term unfairness. One way to measure unfairness is by using the qualification factor. However, this unfairness may be adjusted for by employing an unfairness adjustment mechanism in block 212. The unfairness adjustment mechanism may include adjusting the weights $w(i)$ of each node to enforce a fairness constraint or constraints to ensure a fair distribution of new content. This may include a counter or tally of the number of times that a node received a content chunk and/or the amount of content in each chunk. The qualification factor as described above may be employed to indicate fairness or probability. In other words, if a node has been a push target the probability (and/or the qualification factor) is reduced to lower the probability of being selected again for a next source push.

This also includes updating the probability of each node. For example, the probability is reduced, e.g., by a predetermined amount or in accordance with a formula to decrease the probability that the node will be selected next time. A similar scheme as set forth above for the qualification factor may be employed. For example, the current probability p of node i may be $p(i)=p(i)-1/K$. Other formulas and reductions may also be employed.

In block 214, content is distributed in accordance with the node selections and fairness constraints. Example C illustratively employs the qualification factor, $q(i)$, and the weight factor, $w(i)$, to compute the probability. The probability represents a node's likelihood of being selected to receive new content.

EXAMPLE C

```
get_Push_Target(K)
Begin
    Sum = getBWSum(HC)
    sumQ = 0
    for i in HC
        w(i) = bw(i)/sum
        q(i) = q(i) + w(i)
        sumQ = sumQ + q(i)
    end for
    for i in HC
        p(i) = q(i)/sumQ
    end for
    target_list = Pick(K, p(i))    /* probabilistically
                                      pick K nodes */
    for j in target_list
        q(j) = q(j) – 1/K
    end for
    return target_list
End
```

The function Pick(k,p(i)) returns k randomly selected distinct nodes according to the probability distribution p(i).

EXAMPLE D

Pseudocode for Pick( ) Includes

```
procedure Pick(k,p(i))
begin
    /* Partition the interval [0,1] into n
       subintervals corresponding to the n
       nodes, each subinterval has a length
       equal to p(i); */
    interval(0)=0
    for i = 1 to n
        interval(i) = interval(i-1)+p(i)
        end for
    TargetList = [ ];
    count = 0;
```

-continued

```
    while count < k
        generate a random number r between 0 and 1
        let j be the interval for which r lies in
        if j is not in TargetList
            TargetList(count) = j
            Count = count + 1
        end if
    end while
    return TargetList
End
```

Having described preferred embodiments of a system and method for improving content diversification in data driven p2p streaming using source push (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for data driven streaming, comprising:
computing a weight factor and a qualification factor for each of at least two nodes among a plurality of nodes, based upon a bandwidth of each node;
pushing content to a node based on the qualification factor and the weight factor of the node in accordance with a scheme for increasing content diversity among the nodes, wherein the content is stored on a computer readable storage medium at the node; and
updating the qualification factor for the node which received pushed content.

2. The method as recited in claim 1, wherein updating the qualification factor includes:
dynamically updating the qualification factor for the node which received pushed content, based on a current qualification factor and the weight factor of the node.

3. The method as recited in claim 1, wherein computing a weight factor includes a weight factor for node i ($w(i)$) being computed by $w(i)=bw(i)/sum(bw(j))$, for all nodes j in a host cache located at a stream source where bw is the bandwidth and sum is the summation function.

4. The method as recited in claim 1, wherein the weight factor is maintained at a respective node.

5. The method as recited in claim 1, wherein maintaining an updated qualification factor includes computing the qualification factor ($q(i)$) for node i by $q(i)=q(i)+w(i)$ where $w(i)$ is the weight factor for node i.

6. The method as recited in claim 1, wherein distributing includes pushing content to K nodes with a highest qualification factor to increase content diversity among the nodes, where $K=B/R$, B is a reserved portion for upload bandwidth and R is a current streaming rate.

7. The method as recited in claim 1, further comprising maintaining a host cache located at each stream source to list a subset of peer nodes currently in a system and upon new content arrival selecting K nodes from the host cache to push the new content to.

8. The method as recited in claim 7, wherein updating includes subtracting 1/K from the qualification factor of each of the K nodes.

9. A non-transitory computer readable storage medium comprising a computer readable program, wherein the computer readable program when executed on a computer causes the computer to perform the steps of:
computing a weight factor and a qualification factor for each of at least two nodes among a plurality of nodes, based upon a bandwidth of each node;
pushing content to a node based on the qualification factor in accordance with a scheme for increasing content diversity among the nodes; and
updating the qualification factor for the node which received pushed content.

10. The computer readable storage medium as recited in claim 9, wherein updating the qualification factor includes dynamically updating the qualification factor for the node which received pushed content, based on a current qualification factor and the weight factor of the node.

11. The computer readable storage medium as recited in claim 9, wherein computing a weight factor includes a weight factor for node i ($w(i)$) being computed by $w(i)=bw(i)/sum(bw(j))$, for all nodes j in a host cache located at a stream source where bw is the bandwidth and sum is the summation function.

12. The computer readable storage medium as recited in claim 9, wherein the weight factor is maintained at a respective node.

13. The computer readable storage medium as recited in claim 9, wherein maintaining an updated qualification factor includes computing the qualification factor ($q(i)$) for node i by $q(i)=q(i)+w(i)$ where $w(i)$ is the weight factor for node i.

14. The computer readable storage medium as recited in claim 9, wherein distributing includes pushing content to K nodes with a highest qualification factor to increase content diversity among the nodes, where $K=B/R$, B is a reserved portion for upload bandwidth and R is a current streaming rate.

15. The computer readable storage medium as recited in claim 9, further comprising maintaining a host cache located at each stream source to list a subset of peer nodes currently in a system and upon new content arrival selecting K nodes from the host cache to push the new content to.

16. The computer readable storage medium as recited in claim 15, wherein updating includes subtracting 1/K from the qualification factor of each of the K nodes.

17. A method for data driven streaming, comprising:
computing a probability for at least two nodes where the probability represents a node's likelihood of being selected to receive new content;
selecting nodes for a target list based upon the probability;
pushing new content in a data streaming environment to nodes selected from the target list in accordance with a scheme for increasing content diversity among the nodes, wherein the new content is stored on a computer readable storage medium at the nodes; and
reducing the probability of a node which received pushed content to maintain fairness.

18. The method as recited in claim 17, where fairness is measured via a qualification factor.

19. The method as recited in claim 17, wherein pushing includes pushing content to K nodes in the target list to increase content diversity among the nodes, where $K=B/R$, B is a reserved portion for upload bandwidth and R is a current streaming rate.

20. The method as recited in claim 17, further comprising maintaining a host cache at a node to list a subset of peer nodes currently in a system and upon new content arrival selecting K nodes from the host cache to push the new content to.

21. A non-transitory computer readable storage medium comprising a computer readable program for improving content diversification in data driven streaming, wherein the computer readable program when executed on a computer causes the computer to perform the steps of claim 17.

22. A system for data driven streaming, comprising:
a source configured to push content to a plurality of nodes in accordance with a scheme for increasing content diversity among the nodes, the source including a host cache configured to store a listing of at least a portion of nodes in the system to which content is to be pushed; and
a qualification factor maintained at at least two nodes, the qualification factor being updated for a node which received pushed content based upon available upload bandwidth, the source employing the qualification factor of the at least two nodes to select K nodes to push new content to thereby increasing content diversity among the nodes, wherein the new content is stored on a non-transitory computer readable storage medium at the K nodes.

23. The system as recited in claim 22, where 1/K is subtracted from the qualification factor of each of the K nodes to update the qualification factor.

24. The system as recited in claim 22, wherein the qualification factor is computed by $q(i)=q(i)+w(i)$ where $w(i)$ is the weight factor for node i.

25. The system as recited in claim 22, wherein the weight factor is computed by $w(i)=bw(i)/sum(bw(j))$, for all nodes j in the host cache where bw is the bandwidth and sum is the summation function.

* * * * *